(12) United States Patent
Schweizer et al.

(10) Patent No.: US 12,146,947 B2
(45) Date of Patent: Nov. 19, 2024

(54) OFDM RADAR SENSOR SYSTEM HAVING AN ACTIVELY RETRANSMITTING REPEATER

(71) Applicant: Robert Bosch GmbH, Stuttgart (DE)

(72) Inventors: Benedikt Schweizer, Neu-Ulm (DE); Benedikt Meinecke, Ulm (DE); Christian Waldschmidt, Ulm (DE); Juergen Hasch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 397 days.

(21) Appl. No.: 17/620,365

(22) PCT Filed: May 5, 2020

(86) PCT No.: PCT/EP2020/062382
§ 371 (c)(1),
(2) Date: Dec. 17, 2021

(87) PCT Pub. No.: WO2020/259903
PCT Pub. Date: Dec. 30, 2020

(65) Prior Publication Data
US 2022/0236403 A1    Jul. 28, 2022

(30) Foreign Application Priority Data

Jun. 27, 2019    (DE) .................... 10 2019 209 310.8

(51) Int. Cl.
*G01S 13/75*    (2006.01)
*G01S 13/00*    (2006.01)
(Continued)

(52) U.S. Cl.
CPC .......... *G01S 13/751* (2013.01); *G01S 13/003* (2013.01); *G01S 13/872* (2013.01); *G01S 13/931* (2013.01); *G01S 2013/93271* (2020.01)

(58) Field of Classification Search
CPC .... G01S 13/751; G01S 13/003; G01S 13/872; G01S 13/931; G01S 2013/93271
See application file for complete search history.

(56) References Cited

U.S. PATENT DOCUMENTS 6,009,074 A * 12/1999 Kim ...................... H04B 1/707
370/320
9,705,571 B2 * 7/2017 Gerszberg ............... H04L 5/003
(Continued)

FOREIGN PATENT DOCUMENTS

CN        108627818 A       10/2018
DE    102013220131 A1        4/2015
(Continued)

OTHER PUBLICATIONS

"Andreas Frischen, Cooperative MIMO Radar Network Using Highly Integrated FMCW Radar Sensors, Apr. 4, 2017, IEEE Transaction on Microwave Theory and Techniques, vol. 65, 1355-1366" (Year: 2017).*
(Continued)

*Primary Examiner* — Vladimir Magloire
*Assistant Examiner* — Brandon James Henson
(74) *Attorney, Agent, or Firm* — NORTON ROSE FULBRIGHT US LLP; Gerard A. Messina (57) ABSTRACT

An OFDM radar sensor system having a plurality of transmitting and receiving units. One of the transmitting and receiving units is an OFDM radar sensor, and another of the transmitting and receiving units is a repeater which is configured to modulate a signal generated and transmitted by the OFDM radar sensor and received by the repeater into a signal orthogonal to the signal received by the repeater and to emit the modulated signal. The OFDM radar sensor is configured to separate a portion of a signal received by the OFDM radar sensor, which portion corresponds to the
(Continued)

modulated signal, from a monostatic portion of the signal received by the OFDM radar sensor.

10 Claims, 5 Drawing Sheets

(51) Int. Cl.
*G01S 13/87* (2006.01)
*G01S 13/931* (2020.01)

(56) References Cited

U.S. PATENT DOCUMENTS

| | | | | |
|---|---|---|---|---|
| 2010/0124187 | A1* | 5/2010 | Walker | H04L 27/3488 370/316 |
| 2014/0266857 | A1* | 9/2014 | Mayer | G01S 7/006 342/60 |

FOREIGN PATENT DOCUMENTS

| | | |
|---|---|---|
| DE | 102014214927 A1 | 2/2016 |
| JP | 2000019246 A | 1/2000 |
| JP | 2017513024 A | 5/2017 |
| JP | 2018059895 A | 4/2018 |
| WO | WO-2015067987 A1 * | 5/2015 ........... H04L 1/0003 |

OTHER PUBLICATIONS

International Search Report for PCT/EP2020/062382, Issued Jul. 2, 2020.

Frischen et al., "A Cooperative MIMO Radar Network Using Highly Integrated FMCW Radar Sensors," IEEE Transactions on Microwave Theory and Techniques, vol. 65, No. 4, 2017, pp. 1355-1366.

Dadash et al., "Design of Low-Power Active Tags for Operation With 77-81 GHZ FMCW Radar," IEEE Transactions on Microwave Theory and Techniques, vol. 65, No. 12, 2017, pp. 5377-5388. <https://www.eecg.utoronto.ca/~sorinv/papers/sadegh_MTT_Dec17.pdf> Downloaded Nov. 30, 2021.

* cited by examiner

OFDM RADAR SENSOR SYSTEM HAVING AN ACTIVELY RETRANSMITTING REPEATER

FIELD

The present invention relates to an OFDM radar sensor system.

BACKGROUND INFORMATION

Digital modulation methods utilizing a plurality of carrier frequencies are known as OFDM (orthogonal frequency division multiplexing) methods. Use of OFDM methods for radar systems is being increasingly investigated. In an OFDM method, a frequency band is split up into a plurality of orthogonal sub-bands of respective subcarriers (FDM, frequency division multiplexing), and OFDM symbols are transmitted sequentially, one after another. The transmitted signal of an OFDM symbol is made up of subcarrier signals, which are modulated in accordance with a modulation scheme of the symbol, are orthogonal to each other, and are transmitted simultaneously within the OFDM symbol period. To that end, the subcarrier frequencies are selected in such a manner, that in the frequency spectrum, the maximum of a subcarrier lies on a zero crossing of the other subcarriers.

In the case of the received signal, a distance of a radar object may be estimated in light of the travel time of the OFDM symbols, while a speed estimate may be made in light of a phase characteristic over a sequence of OFDM symbols; the phase characteristic resulting from the Doppler effect. A plurality of radar objects generate a sum of delayed and Doppler-shifted echoes of the transmitted OFDM signal. Using a cycle header (prefix) in front of the symbol period, superposed radar echoes having different travel times may be separated from radar echoes of a subsequent OFDM-Symbol.

"Design of Low-Power Active Tags for Operation with 77-81 GHz FMCW Radar," by M. S. Dadash, J. Hasch, P. Chevalier, A. Cathelin, N. Cahoon and S. P. Voinigescu, IEEE Transactions on Microwave Theory and Techniques, vol. 65, no. 12, pp. 5377-5388, December 2017, describes an active transponder ("active tag"), which modulates the phase of a received radar signal, using a square-wave signal, and emits it again. The active tag may be detected by the radar sensor in light of the reflected signal and may, in this manner, indicate a target object provided with the active tag.

SUMMARY

An object of the present invention is to provide a new OFDM radar sensor system, which includes a plurality of transmitting and receiving units, and in which monostatic and bistatic radar target responses of the transmitting and receiving units may be evaluated.

This object of the present invention may be achieved by an OFDM radar sensor system in accordance with an example embodiment having a plurality of transmitting and receiving units; one of the transmitting and receiving units being an OFDM radar sensor; and another of the transmitting and receiving units being a repeater, which is configured to modulate a signal generated and transmitted by the OFDM radar sensor into a signal orthogonal to the signal received by the repeater, and to emit the modulated signal; and the OFDM radar sensor being configured to separate a portion of a signal received by the OFDM radar sensor, which portion corresponds to the modulated signal, from a monostatic portion of the signal received by the OFDM radar sensor.

Consequently, the repeater is configured to modulate the signal, which is received by the repeater and is a signal generated and transmitted by the OFDM radar sensor, and to emit the modulated signal; the modulated signal being orthogonal to the signal received by the repeater. In other words, the repeater is configured to generate a modulated signal from a received signal by modulating the received signal, and to emit the modulated signal.

The signal generated and transmitted by the OFDM radar sensor and received by the repeater is subsequently referred to as the signal received by the repeater, as well.

The repeater may also be referred to as a transceiver.

In this case, a monostatic portion is understood to be a portion of the received signal, which is received as a radar echo of the transmitted signal transmitted by the OFDM radar sensor on a transmitting and receiving path, without interposition of the repeater. Monostatic signal portions, on whose transmitting and receiving path the repeater is not traversed, are distinguished from bistatic signal portions, which, starting from the OFDM radar sensor, have run through a transmitting and receiving path including the repeater and have consequently been transmitted, finally, by the repeater. Due to the orthogonality, the monostatic and bistatic signal portions of the signal received by the OFDM radar sensor do not interfere with each other.

The orthogonality relates to the OFDM encoding of the transmitted signal. Here, in particular, an orthogonal signal is understood to be a signal orthogonal with respect to the OFDM encoding of the transmitted signal and/or with respect to the signal received by the repeater. In particular, two signals, such as the signal received by the repeater and the modulated signal, are orthogonal to each other, if OFDM subcarriers contained, that is, occupied, in one of the two signals are each orthogonal to the respective OFDM subcarriers contained, that is, occupied, in the other signal. The orthogonality may be present, for example, due to use of different frequency bands in place of the frequency bands of the transmitted signal and/or radar echo, or due to the use of a different frequency band.

Since the bistatic signal portions received are orthogonal to the monostatic signal portions, they may be reliably distinguished from the monostatic signal portions at the OFDM radar sensor. Since the repeater also emits the modulated signal in an active manner, marked attenuation of the retransmitted signal, as would occur, for instance, in the case of a passive signal reflector, may be prevented. In particular, a signal strength reduced by running through the transmitting and receiving path twice may be compensated for completely or at least partially.

The repeater corresponds to a "virtual OFDM radar sensor," whose associated radar echoes are evaluated, however, at the actual OFDM radar sensor. Both the evaluation and the modulation into the HF frequency band and the demodulation into the baseband take place only at a main transmitting and receiving unit, the OFDM radar sensor. Monostatic signal portions received simultaneously at the OFDM radar sensor and bistatic signal portions corresponding to the modulated signal may be evaluated separately due to their orthogonality. The transmitting and receiving units are allowed to cooperate with each other in the distributed OFDM radar sensor system; the transmitting and receiving units being both autonomous and including an OFDM radar sensor, as well as at least one repeater. Since the repeaters carry out only one modulation, for example, a simple frequency shift of the received and retransmitted signal, all of the signals received by the OFDM radar sensor return to the radar frequency of the local oscillator of the OFDM radar sensor, which means that accurate evaluation of the radar echoes of the transmitting and receiving units is rendered possible. In particular, the received radar echoes coming from the different transmitting and receiving units originate from, in each instance, the same OFDM symbol during a given OFDM symbol period, which means that the amplitudes and phase shifts of the radar echoes at the OFDM radar sensor are coherent and may be determined centrally in a precise manner. The orthogonal signals allow the signal source (OFDM radar sensor or repeater) to be assigned in an unequivocal manner during the evaluation in the OFDM radar sensor. Thus, a very wide virtual aperture of the OFDM radar sensor system may be generated as a function of the relative configuration of one or more repeaters with respect to the OFDM radar sensor. The effect of phase jitter may be minimized by the use of a local oscillator only in the OFDM radar sensor. Therefore, improved position-finding of radar targets is rendered possible. In particular, an evaluation from two different sensor positions is enabled, namely, from the actual OFDM radar sensor and from a virtual sensor position corresponding to the position of the repeater. This may be advantageous, in particular, for evaluating targets in the short range below 50 or 100 meters.

In particular, the repeater may be configured to modulate a radar echo, which is received by the repeater and is of the transmitted signal transmitted by the OFDM radar sensor, into, in particular, a signal orthogonal to the radar echo, and to emit the modulated signal. In other words, the repeater may be configured to generate a modulated signal from a radar echo, which is received by a radar target and is of a transmitted signal transmitted by the OFDM radar sensor, by modulating the received radar echo, and to emit the modulated signal. In particular, the modulated signal may be retransmitted on the same transmitting and receiving path.

Preferred refinements of the present invention are disclosed herein.

The signal emitted by the repeater preferably includes the signal received by the repeater, shifted in frequency by a predefined frequency shift. In other words, the signal received by the repeater and shifted in frequency by a predefined frequency shift, using modulation, is contained in the signal emitted by the repeater. Consequently, the modulated signal generated by the repeater includes frequency components, which are shifted in frequency by a predefined frequency shift with respect to corresponding frequency components of the signal received by the repeater. In this context, it is particularly advantageous that in the specific repeater, orthogonal signals, which enable unequivocal assignment of the signal source (OFDM radar sensor or repeater) during the evaluation in the OFDM radar sensor, may be generated, using simple circuit engineering devices. In particular, an HF oscillator is not necessary in the repeater, and a repeater constructed relatively simply may be used. This is particularly advantageous with regard to the robustness and the manufacturing costs of the system.

In accordance with an example embodiment of the present invention, the repeater is preferably configured to modulate the signal generated and transmitted by the OFDM radar sensor and received by the repeater into the signal orthogonal to the signal received by the repeater, using a shift in frequency by a predefined frequency shift. Thus, the orthogonality is produced through shifting by a frequency shift or frequency offset. Therefore, the object is achieved by an OFDM radar sensor system having a plurality of transmitting and receiving units; one of the transmitting and receiving units being an OFDM radar sensor; and another of the transmitting and receiving units being a repeater, which is configured to modulate a signal generated and transmitted by the OFDM radar sensor and received by the repeater, by shifting the frequency by a predefined frequency shift, into a signal orthogonal to the signal received by the repeater, and to emit the modulated signal; and the OFDM radar sensor being configured to separate a portion of a signal received by the OFDM radar sensor, which portion corresponds to the modulated signal, from a monostatic portion of the signal received by the OFDM radar sensor.

A particular advantage of modulating by shifting a frequency by a predefined frequency shift, is that the evaluation at the actual OFDM radar sensor for the received signal portions corresponding to the modulated signal may take place in the same manner as the evaluation of the monostatic, received signal portions. Therefore, the expenditure for signal processing in the OFDM radar sensor system may be advantageously minimized in spite of the provision of a "virtual radar sensor" at the location of the repeater. In this context, the separation of the monostatic and bistatic signal portions is still allowed by the orthogonal modulation.

The shift in frequency by a predefined frequency shift is preferably carried out by shifting the phase of an I/Q signal; the phase shift being varied in accordance with a harmonic oscillation, at a frequency corresponding to the predefined frequency shift. In this manner, conversion of the complex frequency of the I/Q signal may be carried out, in which no unwanted, second sideband is formed. However, other types of modulation, such as phase modulation or amplitude modulation, are also possible.

The repeater preferably has a modulator for shifting the frequency of a signal received by the repeater by a predefined frequency spacing; the modulator including: an I/Q splitter, which is configured to provide I/Q signal components, which are 90° out of phase from each other, based on a reference radar frequency, from a signal received by the repeater; multipliers, which are configured to multiply the specific I/Q signal components by respective I/Q modulation signal components of a modulation signal in a manner retaining the algebraic sign; the modulation signal having a frequency, which corresponds to the predefined frequency spacing; and an output, at which output signal components of the multipliers are combined. The modulation signal preferably corresponds to a harmonic oscillation. The signal orthogonal to the signal received by the repeater is provided at the output. The modulator allows a real shift in frequency by a frequency spacing corresponding to a modulation frequency, to be carried out without generating unwanted harmonics of the modulation frequency in the process; a construction of the repeater that is simple with regard to circuit engineering still being rendered possible. Thus, in particular, no HF oscillator is necessary in the repeater, and no HF oscillator signal has to be supplied. It is also advantageous that a system may be implemented, in which no synchronization signals have to be transmitted over signal connecting lines between the transmitting and receiving units. It is also advantageous that, for example, the I/Q splitter may be constructed as a passive network, such as an RLC network or, in particular, an LC network. Thus, in spite of a relatively simple design with regard to circuit engineering, the modulator described allows an OFDM symbol to be generated from an OFDM symbol contained in the signal received by the repeater; the former OFDM symbol being orthogonal to the latter OFDM symbol and then being emitted by the repeater. It also advantageous that with the aid of the repeater, a highly robust system may be provided. In addition, the possible, separate evaluation of the monostatic and bistatic portions of the received signal at the OFDM radar sensor yields a high performance of the system.

The reference radar frequency may be, for example, a reference carrier frequency or main carrier frequency of the OFDM symbols of the radar sensor and may correspond to the frequency of a local HF oscillator of the OFDM radar sensor.

The combination is preferably a linear combination and may be, in particular, addition or subtraction. The output may be, for example, a sum output, at which the output signal components of the multipliers are summed. Depending on the algebraic sign of the I/Q modulation signal components, a differential output may also be used, at which the output signal components of the multipliers are subtracted. The output signal components are combined while retaining the phases.

In one preferred specific embodiment of the present invention, the predefined frequency shift is a frequency shift, in which an OFDM subcarrier contained in the signal received by the repeater is orthogonal to a corresponding OFDM subcarrier in the modulated signal, which is shifted by the frequency shift. This is the case, when the condition, that frequency shift $\Delta f0$ be equal to an integral multiple of the reciprocal of symbol period T, is satisfied: $\Delta f0=k/T$, where k is a whole number not equal to zero. In particular, frequency shift $\Delta f0$ may be an integral multiple of the subcarrier spacing $\Delta f$ of the OFDM frequency scheme: $\Delta f0=k\Delta f$. Alternatively, or at the same time, frequency shift $\Delta f0$ may be greater than a bandwidth of the transmitted signal transmitted by the OFDM radar sensor or of the signal received by the repeater. The modulated signal is preferably shifted by the above-mentioned frequency shift with respect to the signal received by the repeater.

The signal generated and transmitted by the OFDM radar sensor preferably includes unoccupied OFDM subcarriers in the frequency spectrum; from occupied OFDM subcarriers in the signal received by the repeater, the repeater being configured to generate OFDM subcarriers, which are shifted in frequency and lie in frequency ranges, which correspond to frequency ranges of unassigned OFDM subcarriers in the signal received by the repeater.

Using an increased, e.g., doubled, carrier spacing of the occupied subcarriers, the synthetically generated subcarriers of the signal emitted by the repeater may be transmitted in the gaps between the occupied subcarriers. For example, in the modulated signal, subcarriers are occupied, which are interleaved (in the frequency space or, more precisely, in the OFDM carrier spectrum) with occupied subcarriers in the signal generated and transmitted by the OFDM radar sensor and received by the repeater. This means that in the modulated signal, subcarriers are occupied, which lie between the occupied subcarriers of the signal received by the repeater.

In one preferred specific embodiment of the present invention, the transmitted signal transmitted by the OFDM radar sensor occupies only every nth subcarrier of the OFDM frequency scheme; n being a natural number greater than 1; and with respect to the signal received by the repeater, the modulated signal being shifted by a frequency shift $\Delta f0$, which corresponds to (m+pn) times a subcarrier spacing $\Delta f$ of the OFDM frequency scheme; m being a natural number less than n, and p being a whole number. This means that the frequency spacing between two occupied subcarriers of an OFDM symbol is $n\Delta f$, and that the frequency shift generated in the repeater is $\Delta f0=(m+pn)\Delta f$.

Preferably, p=0. That is, the frequency shift is m times the subcarrier spacing, where m is a natural number less than n. By interleaving the subcarriers used by the OFDM radar sensor for the transmitted signal and the subcarriers used by the repeater for the modulated signal, in such a manner, the frequency range of the transmitted signal may overlap the frequency range of the modulated signal to a maximum degree, which means that the signal transmission characteristics of the respective transmitting and receiving paths of the monostatic and bistatic, received signal portions are as similar as possible. Thus, in one example, only every second subcarrier may be occupied for the transmitted signal transmitted by the OFDM radar sensor (n=2), and the repeater may shift (modulate) the received signal by a subcarrier spacing and retransmit it ($\Delta f0=+/-\Delta f$).

In an expanded system, which includes a plurality of repeaters of the type described, in the case of n>2, orthogonally modulated signals of (n-1) repeaters may be interleaved with the monostatic signal portions and may still be separated at the OFDM radar sensor.

The portion of the received signal corresponding to the modulated signal is preferably separated from a monostatic portion of the received signal, by separately evaluating frequency ranges of the received signal. This allows separate evaluation for corresponding parts of a frequency spectrum of the received signal to be undertaken in a simple manner for a specific, transmitted OFDM symbol. In the frequency spectrum, the signal portions may be separated in a particularly simple manner.

The OFDM radar sensor is preferably configured to detect OFDM symbols, which correspond to monostatic radar echoes, in one or more first frequency ranges of the received signal, and to detect radar echoes of OFDM symbols, which correspond to bistatic radar echoes of the signal modulated by the repeater, in one or more other, second frequency ranges of the received signal. Consequently, in light of the frequency ranges, OFDM symbols are recognized as a modulated signal coming from the repeater and are distinguished from monostatic signals.

When the repeater modulates the signal transmitted by the OFDM radar sensor and received by the repeater into the signal orthogonal to the signal received by the repeater, by shifting the frequency by a predefined frequency shift, the one or more second frequency ranges correspond to the one or more first frequency ranges of the received signal shifted by the frequency shift. Subcarrier frequencies within first frequency ranges are evaluated as OFDM symbols of a monostatic radar response, subcarrier frequencies within other, second frequency ranges are evaluated as frequency-shifted OFDM symbols of a bistatic radar response.

The one or more first frequency ranges preferably include frequencies, which correspond to the occupied OFDM subcarriers of the transmitted signal. The one or more second frequency ranges preferably include frequencies, which are orthogonal to the occupied OFDM subcarriers of the transmitted signal.

For example, the OFDM radar sensor may be configured to separate first frequency ranges of the received signal, which include frequencies that correspond to the occupied OFDM subcarriers of the transmitted signal, from other, second frequency ranges of the received signal, which include frequencies that are orthogonal to the occupied OFDM subcarriers of the transmitted signal. Consequently, the first frequency ranges are separated from the second frequency ranges in the frequency spectrum of the signal received by the OFDM radar sensor, and respective, present frequency bands of OFDM subcarriers may be evaluated separately.

In each instance, for example, radar echoes of OFDM symbols of the transmitted signal and/or radar echoes of the modulated signal of the OFDM symbols present in the repeater may be determined separately in the separate frequency ranges. That is, radar echoes of OFDM symbols of the transmitted signal included in the first frequency ranges may be detected, and radar echoes, which are present in the second frequency ranges and are of OFDM symbols contained in the modulated signal of the repeater, may be detected.

In an evaluation of the portion of the received signal corresponding to the modulated signal, the OFDM radar sensor is preferably configured to take into account a double signal propagation time and a double Doppler shift, which result from the transmitting and receiving path twice covered between the OFDM radar sensor and the repeater, for estimating distance and relative radial velocity of a radar target. Depending on the installation positions of the two components, the transmitting and receiving path between the OFDM radar sensor and the repeater is approximately twice as long as the travel time and/or distance in the monostatic radar echoes for the same radar object. For example, the OFDM radar sensor may be configured to assign a radar echo detected in the frequency spectrum of the monostatic signal portion at a first frequency position, to a radar echo, which is detected in the frequency spectrum of the portion of the received signal corresponding to the modulated signal, at a corresponding, second frequency position; the first frequency position corresponding to the single Doppler shift of a radar echo, and the second frequency position corresponding to the double Doppler shift of a radar echo of the same radar target. Accordingly, the OFDM radar sensor may be configured to associate a delay of a radar echo detected in the monostatic portion of the received signal, which delay corresponds to the single signal propagation time of the radar echo between the sensor and the radar target, to a delay of a radar echo detected in the monostatic portion of the received signal, for the same radar target, which delay corresponds to two run-throughs of a transmitting and receiving path between the sensor, radar target, and repeater.

Therefore, to estimate the distance and speed of a radar object for the bistatic radar echoes, it is taken into account that the transmitting and receiving path between the OFDM radar sensor and the repeater is run through twice.

The OFDM radar sensor system is preferably an OFDM radar sensor system for a motor vehicle. The plurality of transmitting and receiving units are preferably transmitting and receiving units for placement at separate positions on a motor vehicle. The object is further achieved by a motor vehicle including the OFDM radar sensor system.

Below, exemplary embodiments are explained in greater detail with reference to the figures.

DETAILED DESCRIPTION OF EXAMPLE EMBODIMENTS

Figure 1:
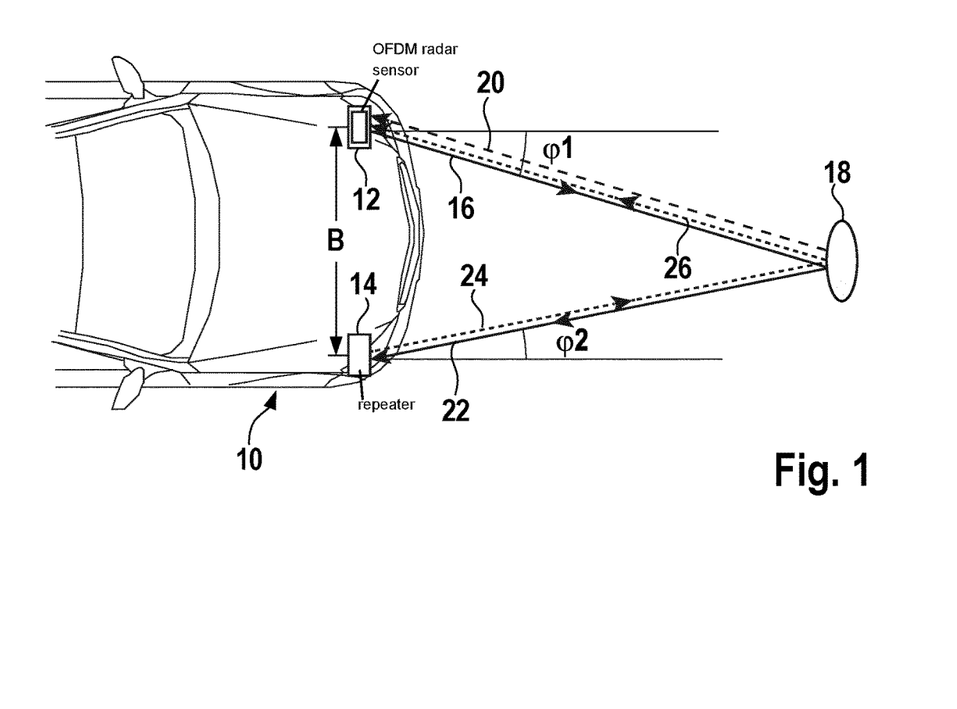
FIG. 1 shows a schematic sketch of a motor vehicle, including an OFDM radar sensor system having an OFDM radar sensor and a repeater, in accordance with an example embodiment of the present invention.

The OFDM radar sensor system shown in FIG. 1 is installed in a motor vehicle 10 and includes transmitting and receiving units in the form of an OFDM radar sensor 12 and an active repeater 14, which are installed in motor vehicle 10 at a lateral distance B from each other, for example, at the vehicle front end. OFDM radar sensor 12 generates and emits a transmitted signal 16, which is reflected or scattered by a radar target 18 and is received by OFDM radar sensor 12 as a radar echo 20. Reflected, transmitted signal 16 is also received by repeater 14 as a radar echo 22.

Repeater 14 amplifies the signal generated and transmitted by OFDM radar sensor 12 and received by repeater 14 as a radar echo 22 and modulates it into a signal 24, which is orthogonal to radar echo 22 and is transmitted by repeater 14. The signal 24 transmitted by the repeater is reflected anew by radar target 18 and is received by OFDM radar sensor 12 as a modulated radar echo 26. Thus, the received signal of OFDM radar sensor 12 includes a monostatic portion, which contains the direct radar echo 20 of radar target 18, and a bistatic portion, which contains modulated radar echo 26 and therefore corresponds to modulated signal 24.

OFDM radar sensor 12 may be, for example, an angle-resolving OFDM radar sensor, by which the angle φ1 at which signal 20 is received by radar target 18, may be estimated. Repeater 14 may be, for example, a transceiver, whose transmitting and/or receiving antenna(e) have a relatively wide field of view in the elevation direction and in the azimuthal direction. The visual range of repeater 14 may correspond to, for example, a visual range of OFDM radar sensor 12 for a given distance range. As illustrated in FIG. 1, this allows the signal 22 reflected to repeater 14 to be retransmitted to OFDM radar sensor 12 on the same transmitting and receiving path while being reflected again at radar target 18. Angle φ2, at which radar echo 22 is received by the repeater, may differ from angle φ1, which means that non-central radar targets 18 also deliver monostatic and bistatic radar echoes 20, 26.

Figure 2:
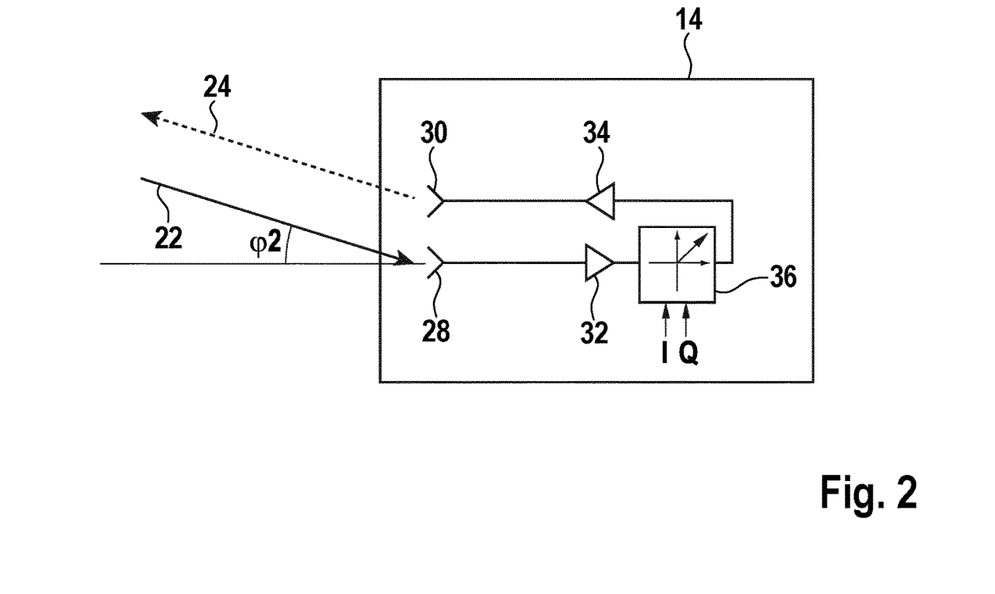
FIG. 2 shows a schematic representation of the repeater, in accordance with an example embodiment of the present invention.

FIG. 2 schematically shows the repeater 14 having a receiving antenna 28 and a transmitting antenna 30. A direction of a portion of transmitted signal 24 is shown in FIG. 2; coming from this direction, signal 24 being reflected again at radar target 18 and received by OFDM radar sensor 12.

Repeater 14 includes at least one amplifier, in the example, a receiving amplifier 32 and a transmitting amplifier 34. In addition, repeater 14 includes a modulator 36 for shifting the frequency of the signal received and re-emitted in modulated form. Modulator 36 subjects received signal 22 to a shift in frequency by a predefined frequency shift $\Delta f0$, in accordance with a shift in a phase of a complex frequency of signal 22; the phase varying according to a harmonic oscillation. The phase shift is controlled via amplitudes I, Q of I/Q signal portions, as explained below, using the example of FIG. 7.

Figure 3:
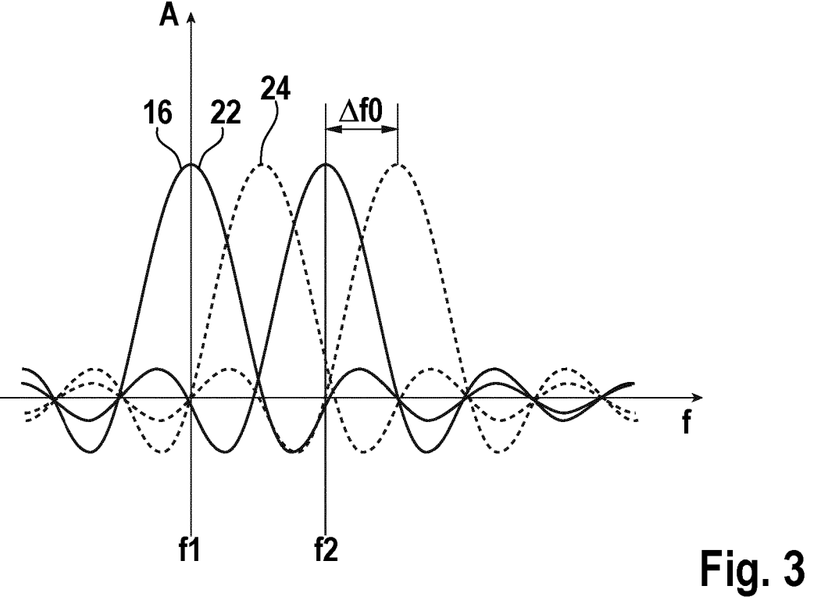
FIG. 3 shows partial spectra of OFDM symbols.

FIG. 3 schematically shows a portion of a spectrum of an OFDM symbol of transmitted signal 16. Signal amplitude A is represented versus frequency f. In an OFDM signal having an OFDM symbol of symbol period T, subcarriers, whose minimum frequency spacing $\Delta f$ satisfies the orthogonality condition $T=1/\Delta f$, are available for the OFDM modulation. In the case of a subcarrier frequency spacing of $\Delta f$, the numbers of the periods of the oscillations of the subcarriers within symbol period T differ by exactly one period or a multiple of it, which means that the subcarriers are orthogonal to each other.

In transmitted signal 16 of OFDM radar sensor 12, only every nth subcarrier is occupied in an OFDM symbol. In the example shown in FIG. 3, n=2. For the purpose of simplified representation, FIG. 3 shows only two occupied subcarriers of the OFDM symbol at frequencies f1 and f2.

Neglecting a Doppler shift, the frequency spectrum of signal 16 shown in FIG. 3 corresponds to the frequency spectrum of the radar echo 22 received by repeater 14. Received signal 22 usually includes a superposition of time-delayed and possibly Doppler-shifted radar echoes, of which only a partial spectrum of a single radar echo 22 is shown in FIG. 3.

Modulator 36 effects a shift in frequency of signal 22 by a frequency shift $\Delta f0$, which corresponds to the minimum subcarrier spacing $\Delta f$. In FIG. 3, the frequency spectrum of the amplified signal 24 retransmitted by repeater 14 is shown schematically with the same amplitude, using a dotted line. Due to the shift in frequency, signals 22, 24 are orthogonal to each other. The occupied subcarriers of the modulated radar echo are situated in the gaps of the OFDM symbols received as radar echo 22, as illustrated in FIG. 3.

Figure 4:
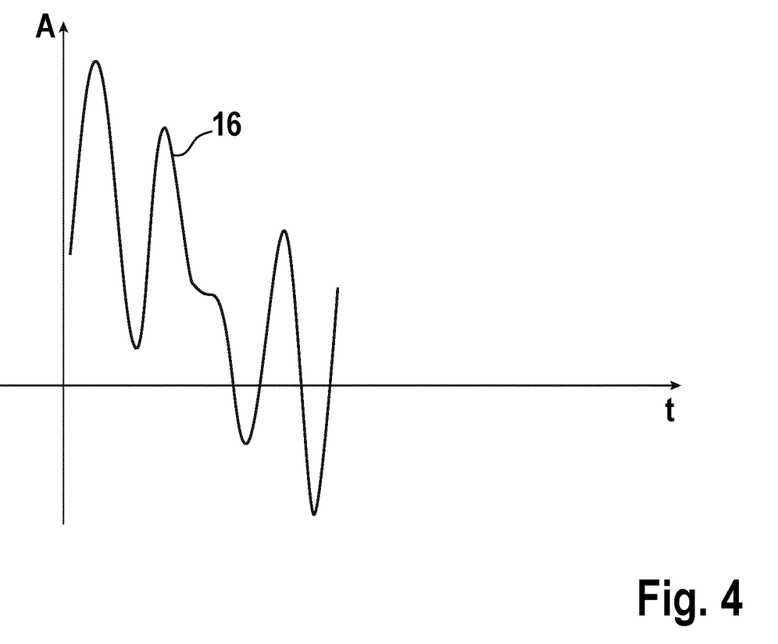
FIG. 4 shows a schematic illustration of a signal characteristic of an OFDM symbol.

FIG. 4 schematically represents a signal characteristic of an OFDM symbol of transmitted signal 16 over time t. The individual, occupied subcarriers of the signal are modulated according to an OFDM modulation scheme; for example, each occupied subcarrier being modulated, using a complex amplitude.

Figure 5:
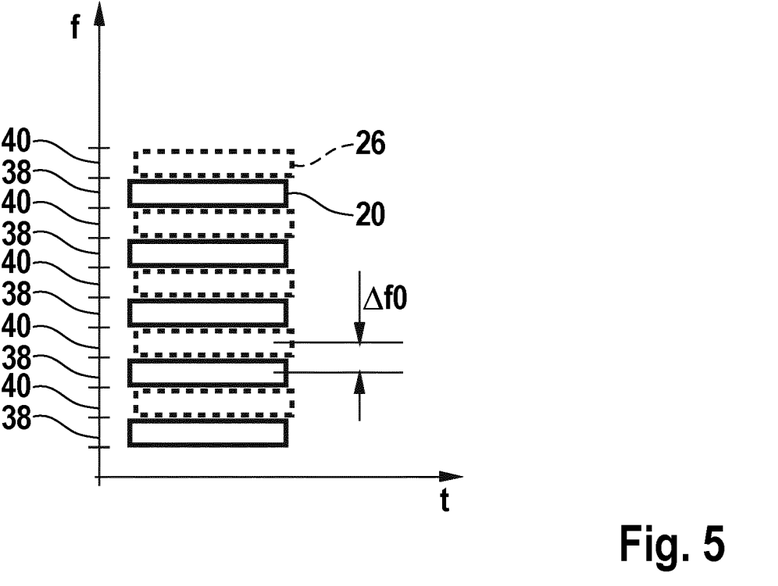
FIG. 5 shows schematic representations of radar echoes of OFDM symbols.

FIG. 5 schematically illustrates a monostatic radar echo 20 of an OFDM symbol, which is contained in the received signal of OFDM radar sensor 12 and includes a plurality of first frequency ranges 38, in which respective subcarriers are situated; as well as an OFDM symbol in second frequency ranges 40, which is contained in bistatic radar echo 26. The monostatic signal portions 20 received by OFDM radar sensor 12 lie in first frequency ranges 38 and usually contain a superposition of time-delayed and possibly Doppler-shifted radar echoes. In contrast, the bistatically received radar echoes 26 additionally have the shift in frequency by the frequency spacing $\Delta f0$ and have, furthermore, a delay and possibly a Doppler shift, which corresponds to two run-throughs of the transmitting and receiving path via radar target 18. Due to the different frequency ranges 38, 40, the monostatic and the bistatic signal portions may be processed separately.

Figure 6:
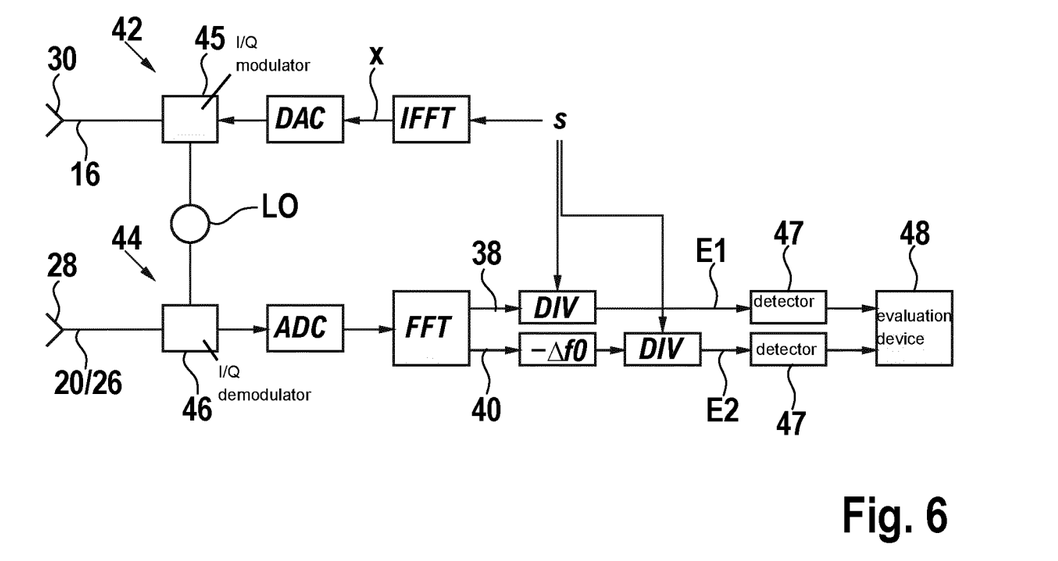
FIG. 6 shows a schematic layout of the OFDM radar sensor, in accordance with an example embodiment of the present invention.

FIG. 6 schematically shows a basic circuit diagram of OFDM radar sensor 12, including a transmitting branch 42 and a receiving branch 44. For each OFDM symbol step, a modulation symbol s, which includes subsymbols for the individual subcarriers, is converted to an OFDM symbol x in the time domain with the aid of inverse Fourier transformation. In this context, OFDM symbol x includes, as is conventional, the actual OFDM symbol of symbol length T, as well as a header (cyclic prefix), which is a copy of an end section of the OFDM symbol. OFDM symbol x is converted by a digital-to-analog converter to an analog signal, with the aid of which an I/Q modulator 45 modulates transmitting frequency f0 of a local oscillator LO, in order to generate transmitted signal 16.

In receiving branch 44, the received signal, which contains signal portions 20 and 26, is demodulated in an I/Q demodulator 46, using the radar frequency of local oscillator LO, and digitized by an analog-to-digital converter, and a Fourier transformation is carried out with the aid of FFT. In the Fourier transformation, the subcarriers contained in received signal 20, 26 are mapped onto separate frequency positions in the frequency spectrum.

First frequency ranges 38 of the frequency spectrum and second frequency ranges 40 of the frequency spectrum are then processed further in separate processing branches. For the first frequency ranges 38, which correspond to the monostatic radar echoes, a complex spectral division of the received signal by transmitted OFDM signal s is carried out. This may be referred to as normalizing of the received signal portion. The processing is carried out for the consecutive OFDM symbols s of an OFDM radar measurement. Thus, a sum of complex exponents generated by the travel time and the Doppler shift is obtained in a two-dimensional spectrum E1 according to the subcarriers and the sequence of OFDM symbols s.

In contrast, the signal portions of second frequency ranges 40 corresponding to the modulated signal of repeater 14 are additionally subjected to demodulation in the form of a shift in frequency by frequency spacing $\Delta f0$, by which repeater 14 modulated the transmitted signal. The further processing, using complex spectral division by the sequence of OFDM symbols s then corresponds to the processing of the monostatic signals, and a two-dimensional spectrum E2 is obtained.

Respective detection devices 47 evaluate the 2-D spectra E1, E2 obtained in the two separate processing branches for frequency ranges 38 and 40 and detect radar objects from peaks in spectra E1, E2. An evaluation device 48 evaluates the detected radar objects. In this context, radar objects, which are detected in light of signals from second frequency ranges 40, at frequency positions, which correspond to the double Doppler shift of the radar echoes, are correlated to radar objects, which are detected in light of signals from first frequency ranges 38, at frequency positions, which correspond to a corresponding, single Doppler shift. In a similar manner, objects, which are detected in light of signals from second frequency ranges that exhibit a double travel time, are assigned to corresponding objects, which are detected in light of signals from first frequency ranges 38 having a single travel time.

Figure 7:
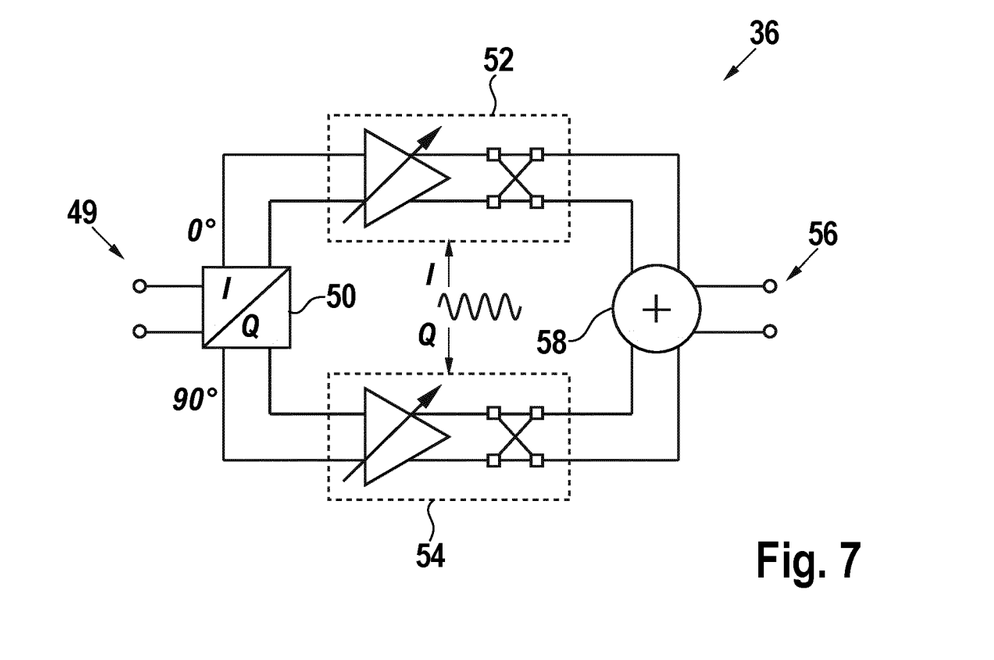
FIG. 7 shows a schematic basic circuit diagram of a modulator of the repeater, in accordance with an example embodiment of the present invention.

FIG. 7 schematically shows a basic circuit diagram of modulator 36. An input 49 of modulator 36 is connected to an I/Q splitter 50, which splits up the input signal of modulator 36 into an in-phase signal and a quadrature signal. In other words, I/Q splitter 50 provides the input signal with a phase shift of 0° in a first, in FIG. 7, upper, signal branch, and provides the input signal with a phase shift of 90° in the second, in FIG. 7, lower, signal branch. I/Q splitter 50 is constructed in a conventional manner, using a passive LC network. The upper and the lower signal branch include multipliers 52 and 54, respectively, which are illustrated symbolically in FIG. 7 by an amplifier having adjustable amplitude, as well as by a symbol, which represents the possible sign change of the signal. Multipliers 52, 54 receive I/Q components of a modulation signal as further input variables. The modulation signal is a harmonic oscillation having a frequency corresponding to frequency shift $\Delta f0$, e.g., I=$\sin(2\pi t\Delta f0)$ and Q=$\cos(2\pi t\Delta f0)$. The outputs of multipliers 52, 54 are summed in-phase at output 56 of modulator 36, using a summing element 58. Consequently, a phase shift of the input signal is carried out by modulator 36; the complex phase-shift vector rotating at the frequency $\Delta f0$.

The exemplary embodiments described are given as examples for illustrating the present invention and may be modified.

Figure 8:
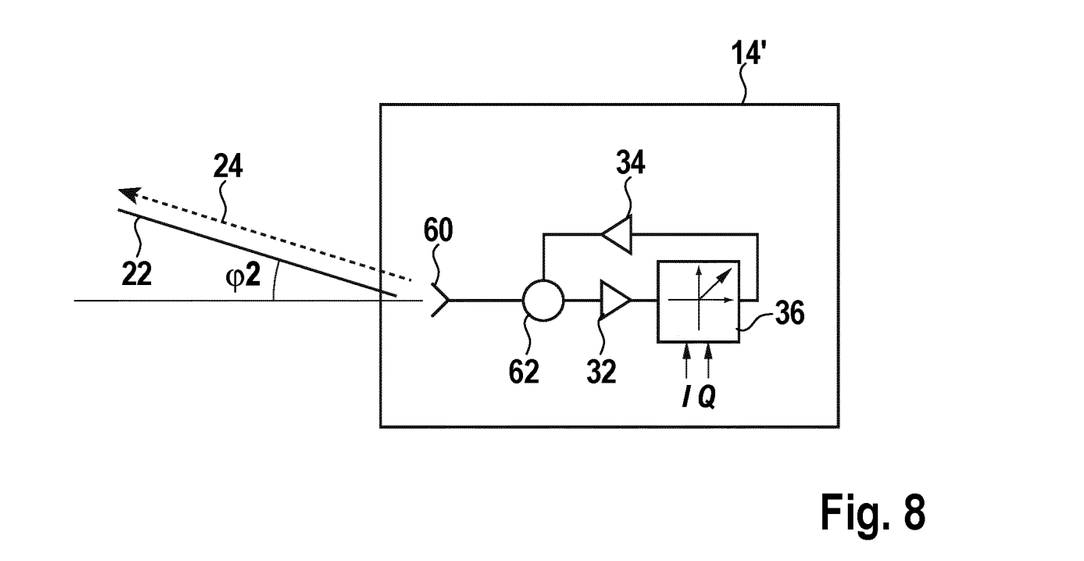
FIG. 8 shows a schematic representation of a further example of a repeater, in accordance with the present invention.

Thus, for example, a repeater 14' shown in FIG. 8 may be used in place of the repeater 14 shown in FIG. 2. Repeater 14' differs from the example of FIG. 2, in that a joint transmitting/receiving antenna 60 is provided, which is connected to modulator 36 via a directional coupler 62 and input amplifier 32 and/or output amplifier 34. Directional coupler 62 includes three input/output terminals. Directional coupler 62 couples the signal received by antenna 60 into modulator 36 via amplifier 32. The output signal of modulator 36 and/or of amplifier 34 is coupled in in the direction of antenna 60 for transmitting.

Figure 9:
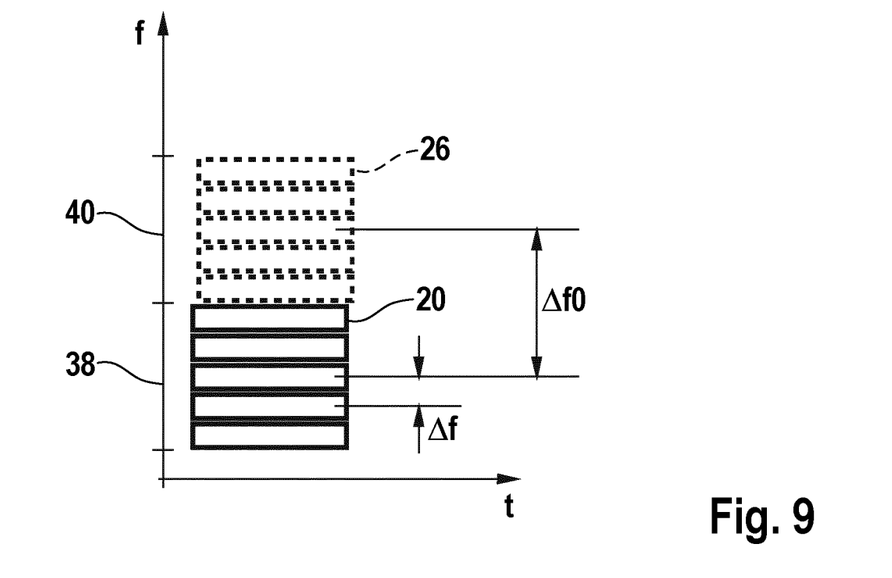
FIG. 9 shows schematic representations of radar echoes of OFDM symbols according to a further example.

FIG. 9 shows a representation corresponding to FIG. 5, in accordance with a further exemplary embodiment. In this example, the frequency shift $\Delta f0$ effected by modulator 36 of repeater 14 corresponds to the occupied bandwidth of an OFDM symbol or is greater than it. In the OFDM symbols of the transmitted signal of OFDM radar sensor 12, directly consecutive subcarriers, which are present together in a first frequency range 38, are occupied in this example. The bistatically received radar echoes are contained in a second frequency range 40, which is shifted by frequency shift $\Delta f0$ with respect to first frequency range 38. When q consecutive subcarriers are used for an OFDM symbol, then, in this example, the frequency spacing is q$\Delta f$, where $\Delta f$ is the spacing between two consecutive subcarriers.

Figure 10:
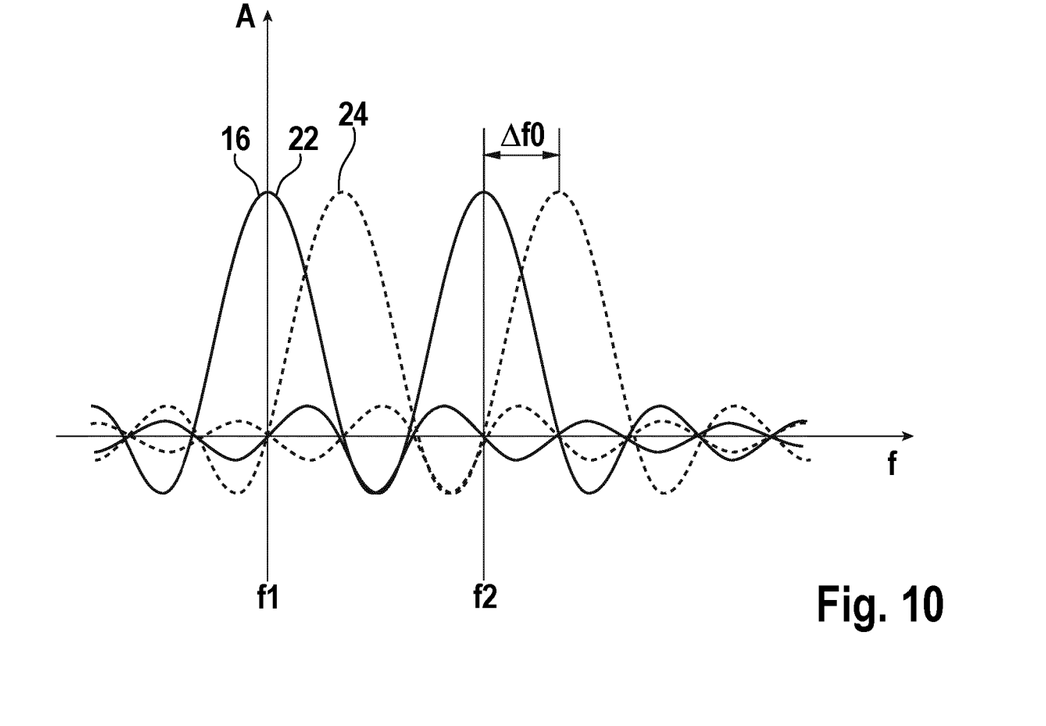
FIG. 10 shows partial spectra of OFDM symbols according to a further example.

The above-described examples of FIG. 2 and FIG. 5 may be generalized in a corresponding manner to an OFDM radar sensor system having a plurality of active repeaters 14. In a representation corresponding to FIG. 3, FIG. 10 shows a portion of an OFDM symbol of a further example of a transmitted signal 16, where only every third subcarrier is occupied. Then, using a frequency shift 2$\Delta f0$, a further repeater 14 may generate a modulated signal, which is orthogonal to the signal of first repeater 14 shifted by $\Delta f0$. OFDM radar sensor 12 may then distinguish the radar echoes coming from the different repeaters 14 from each other and from the monostatic radar echoes, in light of their position in corresponding frequency ranges, and in each instance, process them separately in three processing branches.

What is claimed is:

1. An OFDM radar sensor system, comprising:
an OFDM radar sensor; and
a repeater;
wherein:
the OFDM radar sensor is installed in a vehicle and is configured to generate and transmit a first signal;
the repeater is installed in the vehicle and is configured to:
receive a first reflection of the first signal;
generate, from the reflection of the first signal, a second signal by modulating the reflection of the first signal with a frequency shift to be orthogonal to the reflection of the first signal; and
transmit the second signal, which has been generated using the reflection of the first signal;
the OFDM radar sensor is configured to:
receive a second reflection of the first signal in a monostatic portion of reflection signals;
receive a reflection of the second signal in a bistatic portion of reflection signals;
separate the bistatic portion of the reflection signals from the monostatic portion of the reflection signals; and
based on the separation:
evaluate the second reflection of the first signal to obtain first object information; and
evaluate the reflection of the second signal to obtain second object information;
correlate the first object information and the second object information to each other; and
detect characteristics of one or more objects in surroundings of the vehicle based on the correlation; and
the correlation includes at least one of the following:
(a) correlating respective object representations at respective frequency positions of the reflection of the second signal, which frequency positions correspond to a double Doppler shift relative to the first signal, to respective object representations at respective frequency positions of the second reflection of the first signal, which frequency positions correspond to a single Doppler shift relative to the first signal; and
(b) correlating respective object representations at respective frequency positions of the reflection of the second signal, which frequency positions correspond to a double travel time from a time of transmission of the first signal to a target, to respective object representations at respective frequency positions of the second reflection of the first signal, which frequency positions correspond to a single travel time from the time of transmission of the first signal to the target.

2. The OFDM radar sensor system as recited in claim 1, wherein the frequency shift is one by which an OFDM subcarrier included in the first reflection of the first signal received by the repeater is orthogonal to a corresponding OFDM subcarrier in the second signal, which is shifted by the frequency shift.

3. The OFDM radar sensor system as recited in claim 1, wherein the frequency shift is carried out by shifting a phase of an I/Q signal with a phase shift that is varied in accordance with a harmonic oscillation, at a frequency corresponding to the predefined frequency shift.

4. The OFDM radar sensor system as recited in claim 1, wherein the repeater has a modulator for generating the frequency shift by a predefined frequency spacing, the modulator including:
an I/Q splitter configured to provide I/Q signal components which are 90° out of phase from each other with respect to a reference radar frequency, from the first reflection of the first signal received by the repeater;
multipliers configured to multiply the I/Q signal components by respective I/Q modulation signal components of a modulation signal while retaining an algebraic sign, the modulation signal having a frequency which corresponds to the predefined frequency spacing; and an output at which output signal components of the multipliers are combined.

5. The OFDM radar sensor system as recited in claim 1, wherein:
the first signal includes unoccupied OFDM subcarriers in a frequency spectrum; and
from occupied OFDM subcarriers in the first reflection of the first signal received by the repeater, the repeater is configured to generate OFDM subcarriers, that are shifted in frequency and lie in frequency ranges that correspond to frequency ranges of unoccupied OFDM subcarriers in the first reflection of the first signal received by the repeater.

6. The OFDM radar sensor system as recited in claim 1, wherein:
the first signal transmitted by the OFDM radar sensor occupies only every nth subcarrier, n being a natural number greater than 1; and
the second signal is shifted, relative to the first reflection of the first signal received by the repeater, by a frequency shift that corresponds to (m+pn) times a subcarrier spacing, m being a natural number less than n, and p being a whole number.

7. The OFDM radar sensor system as recited in claim 1, wherein the OFDM radar sensor is configured to detect OFDM symbols that correspond to the monostatic portion, in one or more first frequency ranges of the reflection signals received by the OFDM radar sensor, and to detect OFDM symbols that correspond to the bistatic portion in one or more other second frequency ranges of the reflection signals received by the OFDM radar sensor.

8. The OFDM radar sensor system as recited in claim 1, wherein the correlation includes the correlating the respective object representations at the respective frequency positions of the reflection of the second signal, which frequency positions correspond to the double Doppler shift relative to the first signal, to the respective object representations at the respective frequency positions of the second reflection of the first signal, which frequency positions correspond to the single Doppler shift relative to the first signal.

9. The OFDM radar sensor system as recited in claim 1, wherein the correlation includes the correlating the respective object representations at the respective frequency positions of the reflection of the second signal, which frequency positions correspond to the double travel time from the time of transmission of the first signal to the target, to the respective object representations at the respective frequency positions of the second reflection of the first signal, which frequency positions correspond to the single travel time from the time of transmission of the first signal to the target.

10. The OFDM radar sensor system as recited claim 1, wherein the frequency shift is implemented to cause a maximum amplitude of a subcarrier of the second signal is at a zero-crossing of a subcarrier of the first reflection of the first signal.

* * * * *